No. 863,513. PATENTED AUG. 13, 1907.
J. E. DEER.
COTTON CULTIVATOR.
APPLICATION FILED APR. 10, 1907.
2 SHEETS—SHEET 1.
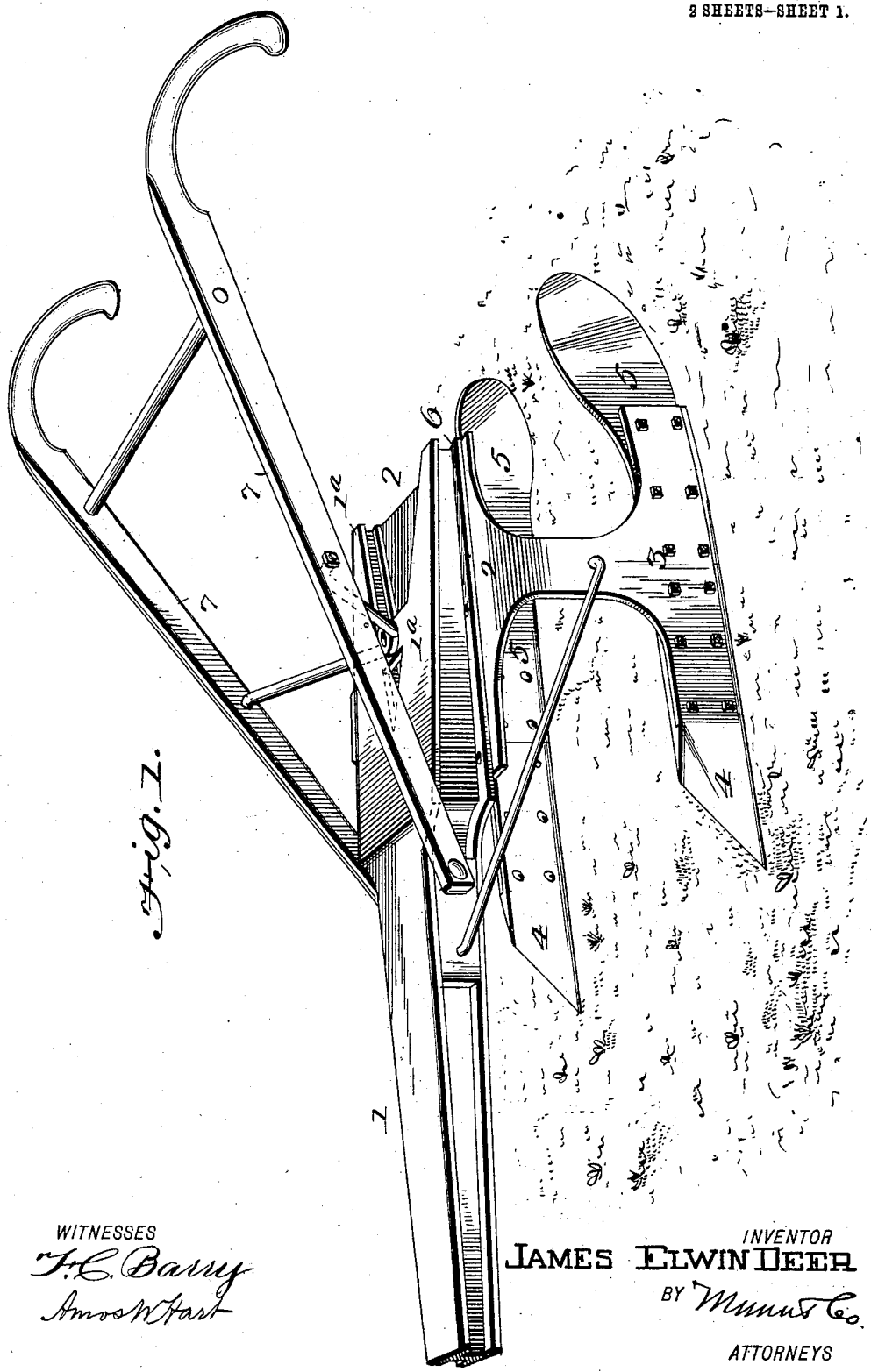
WITNESSES
F. C. Barry
Amos N. Hart
INVENTOR
JAMES ELWIN DEER
BY Munn & Co.
ATTORNEYS No. 863,513.
PATENTED AUG. 13, 1907.
J. E. DEER.
COTTON CULTIVATOR.
APPLICATION FILED APR. 10, 1907.
2 SHEETS—SHEET 2.
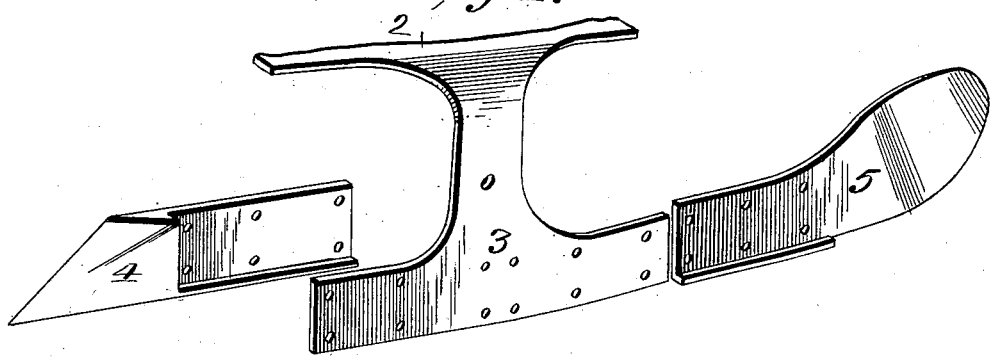
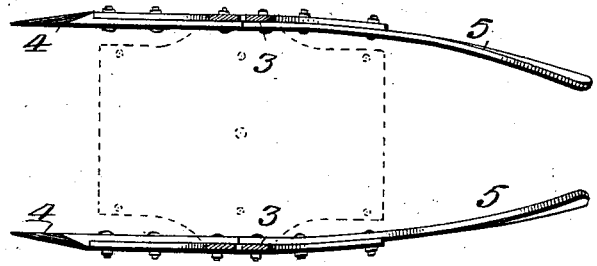
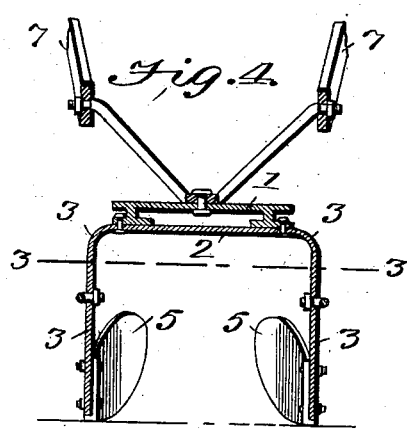
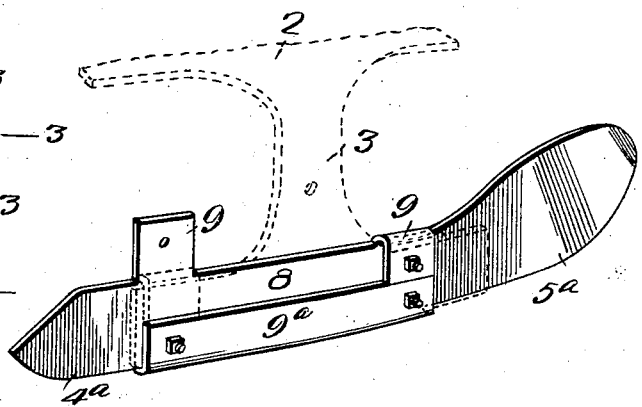
WITNESSES
F. C. Barry
Amos W. Hart
INVENTOR
JAMES ELWIN DEER
BY
ATTORNEYS

UNITED STATES PATENT OFFICE.

JAMES ELWIN DEER, OF FAIRFAX, SOUTH CAROLINA.

COTTON-CULTIVATOR.

No. 863,513.  Specification of Letters Patent.  Patented Aug. 13, 1907.

Application filed April 10, 1907. Serial No. 367,345.

To all whom it may concern:

Be it known that I, JAMES ELWIN DEER, a citizen of the United States, and a resident of Fairfax, in the county of Barnwell and State of South Carolina, have invented an Improved Cotton-Cultivator, of which the following is a specification.

My invention is an improved implement particularly adapted for listing or bedding cotton plants, but which may be used with equal advantage for cultivating other plants, such as beets, and also corn in its first stages of growth.

The construction and combination of parts embodying the invention are as hereinafter described and shown in the accompanying drawing, in which Figure 1 is a perspective view of my improved cultivator. Fig. 2 is a perspective view showing the cultivating devices proper and a portion of the frame to which they are attached. Fig. 3 is a horizontal section on the line 3—3 of Fig. 4. Fig. 4 is a vertical transverse section of the cultivator. Fig. 5 is a perspective view illustrating a modification.

I will first describe the invention as illustrated in Figs. 1 to 4.

In Fig. 1 a beam 1 is shown enlarged and forked at its rear end, and to the underside of the forks 1ª is attached a metal plate, preferably steel, which comprises a broad horizontal top portion 2, and pendent side portions 3, whose lower ends are extended towards both front and rear. The top plate 2 is secured by rivets or bolts to the lower lateral flanges formed on the sides of the fork 1ª. The beam 1 may be constructed of rolled iron or steel or other preferred material, and is made in forked form to secure maximum lightness and strength, while providing a broad bearing for the plate 2, 3.

The cultivating devices proper comprise a point 4, and a wing 5. Each of the points is attached by bolts to the forward portion of side wings 3, and the wings 5 are similarly attached to the rear arms or portions of the same. Both these parts 4 and 5 are constructed of steel. Point 4 has the form of an acute angle at its front end, and is preferably provided with a vertical shoulder that abuts the arm of the frame member 3. Both the point and wing are provided at the lower edge with a lateral flange that extends over the lower edge of the wings 3. The points 4 are in alinement with the wings 3, but the wings 5 are curved slightly inward. In practical use of my improved cultivator the points 4 cut their way easily through the soil, and thus furrow and loosen the same, while the wings 5 following in the furrows or tracks push the loosened earth inward towards the row of plants, thus listing or bedding them in the required manner.

In order that the frame composed of parts 2—3 may be made very light and yet have due rigidity to resist draft, inclined tie-rods and braces 6 connect the tees 3 with the beam in front of the handle 7.

I thus combine in an effective cultivating implement maximum strength, lightness, and rigidity.

By the construction and connection of the parts 4—5 as described, it is obvious that they may be detached and others substituted whenever required, and when constructed separate from the wings 3 they have certain advantages in other respects. I may, however, form the points and wings in one piece, as illustrated in Fig. 5, where a point 4ª and wing 5ª are shown connected and formed integrally with a middle piece 8, the same having extensions or flanges 9—9ª from its upper and lower edges, which are adapted to be bent over and thus clasp the horizontal members of a wing 3.

The cultivator may be drawn by two draft animals, each traveling in a space between adjacent rows of cotton or other plants, but it is practicable, owing to the lightness and draft of the cultivator, to employ but one draft animal, a suitable side attachment of the beam being in such case provided.

What I claim is:

1. The improved cultivator, comprising a beam and the cultivating attachment proper consisting of a metal plate secured to the under side of the beam, and having downwardly curved side portions constructed with front and rear extensions, and points and rear wings secured detachably to such extensions and projecting substantially in line therewith as described.

2. The combination with a beam, and a metal plate secured to the rear portion of the same and having downwardly bent side portions constructed with alined front and rear extensions, and points and wings having lateral flanges that project over the edges of such extensions, and means for securing the parts detachably substantially as described.

3. In a cultivator of the class indicated, the combination with a beam having its rear end forked and provided with lateral flanges, of a cultivating attachment proper comprising a metal plate arranged beneath the fork of the beam and secured to the flanges thereof, said plate having pendent side portions which are arranged parallel and spaced apart, and points and wings projecting from the front and rear extensions of the said side portions, as shown and described.

JAMES ELWIN DEER.

Witnesses:
J. F. LIGHTSEY,
W. M. LIGHTSEY.